(12) United States Patent
Yang

(10) Patent No.: US 6,417,126 B1
(45) Date of Patent: Jul. 9, 2002

(54) CERAMICS AND PROCESS FOR PRODUCING

(75) Inventor: Xi Yang, Muskegon, MI (US)

(73) Assignee: C-Max Technology, Inc., Muskegon, MI (US)

( * ) Notice: Subject to any disclaimer, the term of this patent is extended or adjusted under 35 U.S.C. 154(b) by 0 days.

(21) Appl. No.: 09/511,771

(22) Filed: Feb. 24, 2000

(51) Int. Cl.$^7$ ............... C04B 35/117; C04B 35/56; C04B 35/58
(52) U.S. Cl. ............... 501/127; 501/87; 501/89; 501/92; 501/96.3; 451/102
(58) Field of Search ............... 501/87, 89, 92, 501/96.3, 127; 451/102

(56) References Cited

U.S. PATENT DOCUMENTS

| | | | |
|---|---|---|---|
| 4,732,878 A | | 3/1988 | Everitt et al. |
| RE32,843 E | | 1/1989 | Wei |
| 4,818,635 A | * | 4/1989 | Ekstrom et al. ............. 428/698 |
| 5,164,345 A | * | 11/1992 | Rice et al. ................. 501/91 |
| RE34,446 E | | 11/1993 | Wei |
| 5,324,693 A | * | 6/1994 | Matsuki et al. ............. 501/89 |
| 5,418,197 A | | 5/1995 | Brandt |
| 5,538,926 A | | 7/1996 | Tsuchida et al. |

* cited by examiner

Primary Examiner—Karl Group
(74) Attorney, Agent, or Firm—Ian C. McLeod

(57) ABSTRACT

The present invention provides a process for producing alumina matrix carbide and boride reinforced ceramic composites wherein for any particular composite, the relative density is about 97% or more of the theoretical density. The composites are prepared in a container wherein the interior surfaces of the container are graphite and have a protective coating consisting of a first layer comprising silicon carbide and boron carbide with a binder and a second layer comprising silicon carbide particles, wherein the protective coating prevents carbon bleed-through and the protective coating maintains a boride-containing equilibrium atmosphere during the process. The present invention further provides an alumina-based ceramic composite which comprises a metal carbide preferably selected from the group consisting of silicon carbide, titanium carbide and zirconium carbide, and mixtures thereof, and a boride preferably selected from the group consisting of boron carbide, titanium boride, or zirconium boride, and mixtures thereof. Finally, the present invention provides a protective coating for a surface comprising a first layer of a silicon carbide and a boron carbide in a binder and a second layer comprising a silicon carbide wherein the protective coating is able to withstand repeated exposure to high temperature.

5 Claims, 3 Drawing Sheets

CERAMICS AND PROCESS FOR PRODUCING

CROSS-REFERENCE TO RELATED APPLICATION

None.

STATEMENT REGARDING FEDERALLY SPONSORED RESEARCH OR DEVELOPMENT

None.

BACKGROUND OF THE INVENTION

(1) Field of the Invention

The present invention relates to a process for producing alumina matrix carbide and boride reinforced ceramic composites wherein for any particular composite, the relative density is 97% or more of the theoretical density. The composites are prepared in a container wherein the interior surfaces of the container are graphite and have a protective coating consisting of a first layer comprising silicon carbide and boron carbide with a binder and a second layer comprising silicon carbide particles, wherein the protective coating prevents carbon bleed-through and provides a boride-containing equilibrium atmosphere during the process. The present invention further relates to an alumina-based ceramic composite which comprises a metal carbide preferably selected from the group consisting of silicon carbide, titanium carbide and zirconium carbide, and mixtures thereof, and a boride preferably selected from the group consisting of boron carbide, titanium boride, or zirconium boride, and mixtures thereof. Finally, the present invention relates to a protective coating for an article comprising a first layer of a silicon carbide and a boron carbide in a binder and a second layer comprising a silicon carbide particles wherein the protective coating is able to withstand repeated exposure to high temperature.

(2) Description of Related Art

Aluminum oxide (alumina) based ceramics which contain at least 50% alumina and carbides produced by hot pressing or hot isostatic pressing have high strength and excellent resistance to corrosion, oxidation, and wear. However, these alumina-based ceramics have poor strength and toughness when compared to silicon nitride-based ceramic materials. Of particular importance is that alumina-based ceramics generally have relatively poor strength and toughness and are sensitive to thermal crack formation because the aluminum oxide has relatively poor thermal conductivity. In the case of metal cutting tools, this leads to very short tool lives in machining steel, particularly under conditions with short operating times and varying cutting depths. Various attempts have been made to improve the strength, toughness, and thermal conductivity of alumina-based ceramics. To some extent, the thermal properties of alumina-based ceramics has been improved by addition of titanium carbide or titanium nitride to improve the thermal conductivity of the ceramic. The carbide/nitride also had the effect of increasing the hardness of the ceramic. However, the toughness of the ceramic material was insufficient for fabricating tools to use for cutting steel. When zirconium oxide was added to the aluminum oxide a composite was produced which had increased strength and toughness but with thermal properties not much better than those of pure aluminum oxide. The addition of silicon carbide to aluminum oxide has resulted in an alumina-based ceramic containing silicon carbide whiskers which has increased strength and toughness when compared to pure alumina-based ceramics.

Alumina-based ceramics have been described in the prior art. For example, U.S. Pat. No. 4,732,878 discloses an oxidation resistant alumina-based ceramic comprising alumina-silica or alumina-boria-silica as a first phase and an in situ generated discontinuous carbon second phase. U.S. Pat. No. 5,418,197 discloses fabrication of an alumina-based ceramic containing homogeneously dispersed silicon carbide whiskers. U.S. Pat. No. 5,538,926 discloses fabrication of alumina-based ceramic containing silicon carbide whiskers and one or more oxides of Mg, Si, Ca, Ti, Zr, C, Ni, Y, and rare earth elements. U.S. Re. 32,843 and Re. 34,446 disclose fabrication of alumina-based ceramics comprising silicon carbide whiskers using a hot-press method.

However, despite the research into developing high density alumina-based ceramics, there still remains a need for a method that enables the efficient production of alumina-based ceramics with a density greater than 97% of the theoretical density for the ceramic and which has improved thermal conductivity, strength, and toughness, and increased resistance to wear, corrosion, and oxidation.

SUMMARY OF THE INVENTION

The present invention provides a process for producing alumina matrix carbide and boride reinforced ceramic composites wherein for any particular composite, the relative density is 97% or more of the theoretical density. The composites are preferably prepared in a container wherein the interior surfaces of the container are graphite and have a protective coating consisting of a first layer comprising silicon carbide and boron carbide with a binder and a second layer comprising silicon carbide particles, wherein the protective coating prevents carbon bleed-through and provides boride. During firing, the protective coating provides boride in an equilibrium atmosphere in the container wherein the boride is at a concentration that inhibits leeching of the boron or boron carbide from the green preform. The equilibrium atmosphere also prevents carbon from outside the container from entering the container and impregnating the green preform. Thus, the equilibrium atmosphere enables alumina-based ceramics to be fabricated to higher densities. The present invention further provides an alumina-based ceramic composite which comprises a metal carbide preferably selected from the group consisting of silicon carbide, titanium carbide and zirconium carbide, and mixtures thereof, and a boride preferably selected from the group consisting of boron carbide, titanium boride, or zirconium boride, and mixtures thereof. Finally, the present invention provides a protective coating for an article comprising a first layer of a silicon carbide and a boron carbide in a binder and a second layer comprising silicon carbide particles wherein the protective coating is able to withstand repeated exposure to high temperature.

Thus, the present invention provides a process for preparation of a dense alumina-based ceramic composition which comprises: (a) providing a container with a removable closure, wherein inside surfaces of the container and closure are graphite and have been first coated with a mixture of metal carbide particles, boride particles, and an organic binder in water to form a first layer which is then coated with a second layer of silicon carbide particles to form a coating which is then dried; (b) introducing into the container a dried green preform made from a mixture of an alumina and a metal carbide powder and a boride powder, wherein the mixture has been milled together; (c) firing the preform at a temperature sufficient to produce the ceramic composition which has a density of at least 97 percent of a theoretical density for the ceramic composition.

In particular, the present invention provides a process for preparation of a dense alumina-based ceramic composition which comprises: (a) providing a container with a removable closure, wherein inside surfaces of the container and closure are graphite and have been first coated with a mixture of silicon carbide powder, boron carbide powder, and an organic binder in water to form a first layer which is then coated with a second layer of silicon carbide particles to form a coating which is then dried; (b) introducing into the container a dried green preform made from a mixture of an alumina and a metal carbide powder and a boride powder, wherein the mixture has been milled together; (c) firing the preform at a temperature sufficient to produce the ceramic composition which has a density of at least 97 percent of a theoretical density for the ceramic composition.

In a preferred embodiment, the present invention provides a process wherein the metal carbide is selected from the group consisting of silicon carbide, titanium carbide, zirconium carbide, and mixtures thereof and the boride is selected from the group consisting of boron carbide, titanium boride, zirconium boride, and mixtures thereof. Optionally, the present invention further provides a process wherein composition comprising the preform green includes a sintering aid selected from the group consisting of yttria, rare earths, magnesia, calcia, lanthanides, and mixtures thereof. Preferably, the sintering aid is yttria ($Y_2O_3$).

The present invention further provides a process for preparation of a dense alumina-based ceramic composition which comprises: (a) providing a container with a removable closure, wherein inside surfaces of the container and closure are graphite and have been first coated with a mixture of silicon carbide powder, boron carbide powder, and an organic binder in water to form a first layer which is then coated with a second layer of silicon carbide particles to form a coating which is then dried; (b) introducing into the container a dried green preform made from a mixture of an aluminum oxide, a silicon carbide powder, and a boron carbide powder, wherein the mixture has been milled together; (c) firing the preform at a temperature sufficient to produce the ceramic composition which has a density of at least 97 percent of a theoretical density for the ceramic composition.

In particular embodiments of the present invention the first layer comprises 98 wt % of the silicon carbide powder, 1 wt % of the boron carbide powder, and 2 wt % of the organic binder and the silicon carbide particles are of about 70 to 120 mesh.

In the process of the present invention the firing is performed by ramping the temperature to about 500° C. at a rate of between about 1° to 5° C. per minute, then to about 1250° C. to 1600° C. at a rate of 1° to 10° C. per minute, then to a temperature of between about 1600° to 1900° C. at a rate of about 1° to 20° C. per minute, and then maintaining the preform at the temperature of 1600° to 1900° C. for a time sufficient to achieve a minimum density of 97%, preferably a time between about 10 to 120 minutes. Alternatively, the firing is performed by ramping the temperature to about 500° C. at a rate of between about 1° to 5° C. per minute, then to about 1600° C. at a rate of 5° to 20° C. per minute, and then maintaining the preform at the temperature of 1600° to 1900° C. for a time sufficient to achieve a minimum density of 97%, preferably a time between about 10 to 120 minutes. In a preferred embodiment of the present invention, the firing is performed in an atmosphere consisting of an inert gas wherein the gas is selected from the group consisting of argon, helium, nitrogen, and mixtures thereof.

In the process of the present invention, the green preform comprises 65 to 85 wt % of the alumina with a median particle size in the size range of 0.4 to 1.5 $d_{50}$ μm, 0.5 to 20 wt % of the boride with a median particle size of not more than 30 $d_{50}$ μm, and 2 to 21.4 wt % of the metal carbide with median particle size in the size range of 2 to 10 $d_{50}$ μm. Therefore, the present invention provides a preform green composition for producing a ceramic comprising 65 to 85 wt % of the alumina with a median particle size in the size range of 0.4 to 1.5 $d_{50}$ μm, 0.5 to 20 wt % of the boride with a median particle size of not more than 30 $d_{50}$ μm, and 2 to 21.4 wt % of the metal carbide with median particle size in the size range of 2 to 10 $d_{50}$ μm. Thus, the present invention further provides a fired ceramic composite comprising 65 to 85 wt % of the alumina with a median particle size in the size range of 0.4 to 1.5 $d_{50}$ μm, 0.5 to 20 wt % of the boride with a median particle size of not more than 30 $d_{50}$ μm, and 2 to 21.4 wt % of the metal carbide with median particle size in the size range of 2 to 10 $d_{50}$ μm.

In particular, the present invention provides the composition and the fired ceramic composite wherein the alumina is 80 wt % with a median particle size in the size range of 0.4 to 1.5 $d_{50}$ μm, the boride is boron carbide, e.g., $B_4C$, and is 5.4 wt % with a median particle size in the size range of 3 to 11 $d_{50}$ μm, and the metal carbide is a mixture of silicon carbide which is 2 wt % with a median particle size in the size range of 2 to 10 $d_{50}$ μm and 12.6 wt % with a median particle size in the size range of 2 to 10 $d_{50}$ μm; or wherein the alumina is 80 wt % with a median particle size in the size range of 0.4 to 1.5 $d_{50}$ μm, the boride is boron carbide, e.g., $B_4C$, and is 5.4 wt % with a median particle size in the size range of 3 to 11 $d_{50}$ μm, and the metal carbide is silicon carbide and is 14.6 wt % with a median particle size in the size range of 0.5 to 1.0 $d_{50}$ μm; or wherein the alumina is 78.1 wt % with a median particle size in the size range of 0.4 to 1.5 $d_{50}$ μm, the boride is boron carbide, e.g., $B_4C$, and is 0.5 wt % with a median particle size not more than 12 $d_{50}$ μm, and the metal carbide is silicon carbide and is 21.4 wt % with a median particle size in the size range of 0.5 to 1.0 $d_{50}$ μm; or wherein the alumina is 60 to 85 wt % with a median particle size in the size range of 0.4 to 1.5 $d_{50}$ μm, the boride is boron carbide, e.g., $B_4C$, and is 1 to 20 wt % with a median particle size in the size range of 1 to 30 $d_{50}$ μm, and the metal carbide is silicon carbide and is 5 to 15 wt % with a median particle size in the size range of 0.5 to 20 $d_{50}$ μm; or wherein the alumina is 60 to 85 wt % with a median particle size in the size range of 0.4 to 1.5 $d_{50}$ μm, the boride is titanium boride, e.g., $TiB_2$, and is 1 to 20 wt % with a median particle size in the size range of 1 to 30 $d_{50}$ μm, and the silicon carbide is 5 to 15 wt % with a median particle size in the size range of 0.5 to 20 $d_{50}$ μm. The carbide and/or boride particles can be a powder or whiskers. The green preform is made into a shape by slip casting, pill pressing, cold isostatic pressing, extrusion forming, injection molding, or dry bag pressing.

Further still, the present invention provides a protective coating for a surface that is exposed to high temperatures wherein the surface is graphite prepared by a process comprising providing a mixture of metal carbide particles, boride particles, and an organic binder in water to form a first layer on the surface which is then coated with a second layer comprising metal carbide particles which is then dried to form the protective coating. Preferably, a protective coating for a surface that is exposed to high temperatures wherein the surface is graphite prepared by a process comprising providing a mixture of silicon carbide powder, boron carbide powder, and an organic binder in water to form a first layer on the surface which is then coated with a second layer comprising metal carbide particles which is then dried to form the protective coating. In particular, the protective coating wherein the first layer comprises 98 wt % of the silicon carbide powder, 1 wt % of the boron carbide powder, and 2 wt % of the organic binder and wherein the second layer of silicon carbide particles is 70 to 120 mesh.

The present invention further provides a container with a removable closure for firing ceramics wherein inside surfaces of the container and closure are graphite and have been first coated with a mixture of metal carbide particles, boride particles, and an organic binder in water to form a first layer which is then coated with a second layer of metal carbide particles to form a coating which is then dried. Preferably, a container with a removable closure for firing ceramics wherein inside surfaces of the container and closure are graphite and have been first coated with a mixture of silicon carbide powder, boron carbide powder, and an organic binder in water to form a first layer which is then coated with a second layer of silicon carbide particles to form a coating which is then dried. In particular, a container wherein the first layer comprises 98 wt % of the silicon carbide powder, 1 wt % of the boron carbide powder, and 2 wt % of the organic binder and wherein the second layer of silicon carbide particles is 70 to 120 mesh.

Further still, the present invention provides an industrial blast nozzle assembly comprising: a ceramic composite liner having a bore extending therethrough to provide an inlet opening and an outlet opening wherein the ceramic composite liner which comprises 65 to 85 wt % of an alumina, 0.5 to 20 wt % of a boride, and 2 to 21.4 wt % of a metal carbide has a density of at least 97% of a theoretical density for the ceramic; and a metal casing having a bore extending therethrough, wherein the liner is mounted in the bore of the metal casing. In a preferred embodiment, the metal casing is a metal selected from the group consisting of brass and aluminum. In a particular embodiment of the nozzle assembly, the metal casing has a threaded end and the liner is mounted in the bore of the metal casing such that the threaded end of the metal casing and the inlet end of the liner form an end which is substantially flush. Optionally, the nozzle assembly further comprises a protective coating which binds together the liner and metal casing. Preferably, the protective coating is polyurethane. In a preferred embodiment of the liner in the nozzle assembly, the inlet opening has a wider diameter than the outlet opening and there is a venturi shape in the bore between the inlet and the outlet openings. In particular embodiments of the liner for the nozzle assembly, the alumina has a median particle size in the size range of 0.4 to 1.5 $d_{50}$ μm, the boride has a median particle size of not more than 30 $d_{50}$ μm, and the metal carbide has a median particle size in the size range of 2 to 10 $d_{50}$ μm. In a preferred embodiment of the liner for the nozzle assembly, the metal carbide is selected from the group consisting of silicon carbide, titanium carbide, zirconium carbide, and mixtures thereof and the boride is selected from the group consisting of boron carbide, titanium boride, zirconium boride, and mixtures thereof.

Further still, the present invention provides a liner for an industrial blast nozzle assembly comprising a ceramic composite having a bore extending therethrough to provide an inlet opening and an outlet opening wherein the ceramic composite which comprises 65 to 85 wt % of an alumina, 0.5 to 20 wt % of a boride, and 2 to 21.4 wt % of a metal carbide has a density of at least 97% of a theoretical density for the ceramic. In a preferred embodiment of the liner, the inlet opening has a wider diameter than the outlet opening and there is a venturi shape in the bore between the inlet and the outlet openings. In particular, the present invention provides a liner wherein the alumina has a median particle size in the size range of 0.4 to 1.5 $d_{50}$ μm, the boride has a median particle size of not more than 30 $d_{50}$ μm, and the metal carbide has a median particle size in the size range of 2 to 10 $d_{50}$ μm. Preferably, the metal carbide is selected from the group consisting of silicon carbide, titanium carbide, zirconium carbide, and mixtures thereof and the boride is selected from the group consisting of boron carbide, titanium boride, zirconium boride, and mixtures thereof.

In particular embodiments of the liner for the industrial blast nozzle, the alumina is 80 wt % with a median particle size in the size range of 0.4 to 1.5 $d_{50}$ μm, the boride is boron carbide, e.g., $B_4C$, and is 5.4 wt % with a median particle size in the size range of 3 to 11 $d_{50}$ μm, and the metal carbide is a mixture of silicon carbide which is 2 wt % with a median particle size in the size range of 2 to 10 $d_{50}$ μm and 12.6 wt % with a median particle size in the size range of 2 to 10 $d_{50}$ μm; or wherein the alumina is 80 wt % with a median particle size in the size range of 0.4 to 1.5 $d_{50}$ μm, the boride is boron carbide, e.g., $B_4C$, and is 5.4 wt % with a median particle size in the size range of 3 to 11 $d_{50}$ μm, and the metal carbide is silicon carbide and is 14.6 wt % with, a median particle size in the size range of 0.5 to 1.0 $d_{50}$ μm; or wherein the alumina is 78.1 wt % with a median particle size in the size range of 0.4 to 1.5 $d_{50}$ μm, the boride is boron carbide, e.g., $B_4C$, and is 0.5 wt % with a median particle size not more than 12 $d_{50}$ μm, and the metal carbide is silicon carbide and is 21.4 wt % with a median particle size in the size range of 0.5 to 1.0 $d_{50}$ μm; or wherein the alumina is 60 to 85 wt % with a median particle size in the size range of 0.4 to 1.5 $d_{50}$ μm, the boride is boron carbide, e.g., $B_4C$, and is 1 to 20 wt % with a median particle size in the size range of 1 to 30 $d_{50}$ μm, and the metal carbide is silicon carbide and is 5 to 15 wt % with a median particle size in the size range of 0.5 to 20 $d_{50}$ μm; or wherein the alumina is 60 to 85 wt % with a median particle size in the size range of 0.4 to 1.5 $d_{50}$ μm, the boride is titanium boride, e.g., $TiB_2$, and is 1 to 20 wt % with a median particle size in the size range of 1 to 30 $d_{50}$ μm, and the silicon carbide is 5 to 15 wt % with a median particle size in the size range of 0.5 to 20 $d_{50}$ μm.

Therefore, it is an object of the present invention to provide a process for producing an alumina matrix carbide and boride reinforced ceramic composites which have a relative density greater than 97% of the theoretical density.

It is a further object of the present invention to provide a protective coating for an article which protects the article from repeated exposure to a carbon atmosphere.

Further still, it is an object of the present invention to provide an industrial blast nozzle assembly wherein the nozzle assembly has ceramic liner comprising an alumina-based composite containing carbides and borides which has a relative density greater than 97% of the theoretical density.

These and other objects of the present invention will become increasing apparent with reference to the following description of preferred embodiments and examples.

DESCRIPTION OF PREFERRED EMBODIMENTS

Figure 1:
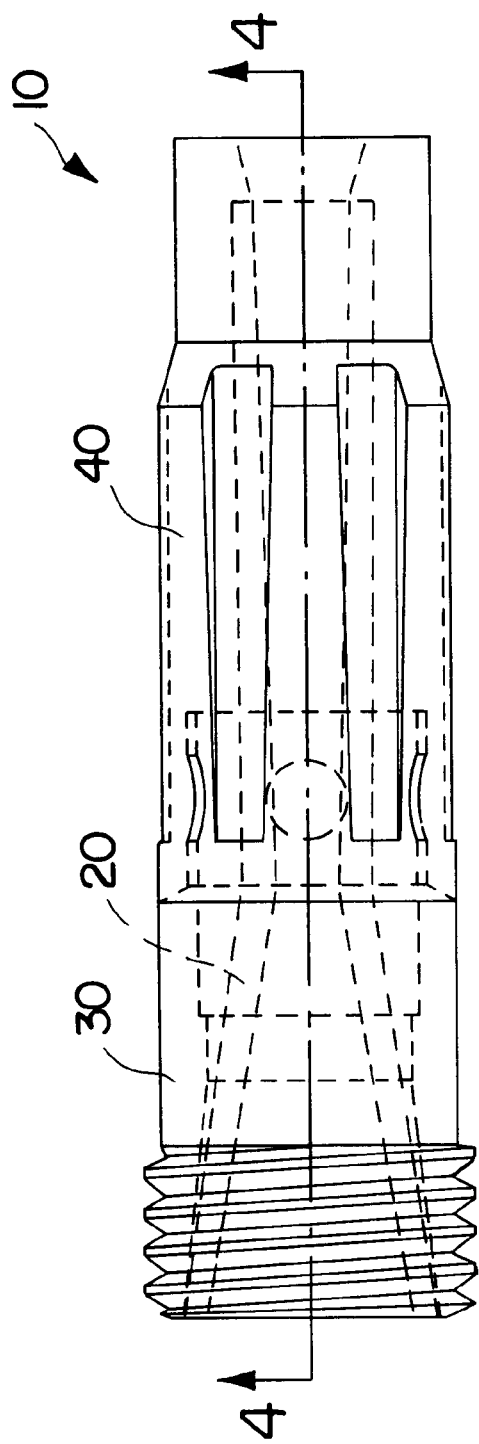
FIG. 1 is a plan view of an industrial blast nozzle assembly 10.

As used herein, the term "$d_{50}$" means the median diameter of the particles. As used herein, the term "mesh" refers to the size of particles that are U.S. mesh.

The present invention provides as process for sintering dense aluminum oxide (alumina) based ceramic composites which contain carbides and borides and has after firing a relative density of about 97% or greater of the theoretical density for the ceramic. Producing ceramic composites with relative densities that approach the theoretical density for the composite is an important objective because for every 1% increment of density above a theoretical density of 97% can dramatically increase the structural properties of the fired composite. For example, the present invention provides alumina-based composites and a process for producing alumina-based ceramics which have a theoretical density of about 97% or greater and which have one or more of the following properties: increased hardness, toughness, strength, and thermal conductivity which improves resistance to thermal crack formation, and enhanced resistance to oxidation, corrosion, and wear.

In particular, the present invention provides a process for preparing multiphase alumina-based ceramics and compositions for preparing multiphase alumina-based ceramics which comprise a continuous alumina matrix phase and one or more discontinuous phases consisting of silicon carbide and boride carbide. The discontinuous phase or phases can optionally contain various amounts of carbon. Optional still, the alumina phase can contain silica from an amorphous silica or an organosilane, preferably a trialkoxy organofunctional silane or tetraalkoxysilane and/or boria, preferably boric acid.

Ceramics, in particular alumina-based ceramics, are generally manufactured by first forming a green body or shape from a powder followed by drying and firing or sintering at a high temperature. The green body forming processes includes, but is not limited to, by slip casting, pill pressing, cold isostatic pressing, extrusion forming, injection molding, or dry bag pressing. Dry pressing is when the powder is formed into a shape by a mold. Slip casting, is when a slurry of powder in water is placed in a porous mold and the water is removed by vacuum or by capillary action. Extrusion forming is when the powder is mixed with water and a plasticizer and is extruded as a thick paste. Injection molding is when the powder is mixed with an organic polymer., heating the mixture to melt the polymer, and injecting the mixture into a cold mold wherein the polymer solidifies. Other methods for forming preform greens are cold isostatic pressing and dry bag pressing. After forming the green body, the green body is fired or sintered at a high temperature which sinters the constituents of the ceramic powders to form the ceramic product. The preform green can further include a sintering aid, which includes but is not limited to, yttria, magnesia, calcia, lanthanides, and rare earth metals. Preferably the sintering aid is yttria, e.g., $Y_2O_3$. The sintering aid, which is used to help increase the density of the ceramic composite, is preferably used in an amount up to and including 5 wt % of the composition.

As used in the process of the present invention, the preferred ceramic powders comprising the composite include alumina, metal carbide, and boride. The metal carbides can be any combination of carbides, preferably a carbide selected from the group consisting of silicon carbide, titanium carbide, zirconium carbide, and mixtures thereof. The borides can be any combination of borides, preferably a boride selected from the group consisting of boron carbide, e.g., $B_4C$, titanium boride, e.g., $TiB_2$, zirconium boride and mixtures thereof. The composition of the composite can include from about 50 vol % to 95 vol % of alumina and from about 0.1 vol % to 50 vol % of any combination of carbides and borides. The alumina is preferably alumina oxide. The particle size of the alumina, carbide, and boride can be from about 50 ηm to 100 μm. The high density materials produced by the process of the present invention have one or more of the following desirable properties: excellent thermal shock resistance, oxidation resistance and high fracture toughness of silicon carbide, with the hardness, wear resistance and low specific gravity of boron carbide. While the carbide and boride can be a powder, the carbide and/or boride can also be provided as particulate matter such as in the form of whiskers.

The ceramic powders can further contain an organic binder to facilitate fabrication of preformed shapes with the ceramic powders. The binder is about 1 to 5 wt % of the total ceramic powders and is uniformly mixed with the ceramic powders. The binder is temporary and is burned off during the firing or sintering step. The binder is preferably polyvinyl alcohol or PVP, however, other temporary binders can be used, such as coal tar pitch, long chain fatty material (for example "CARBOWAX" wax), metallic stearates such as aluminum stearates and zinc stearates, sugars, starches, alginates, and polymethyl phenylene. The ceramic powders containing the binder are made into preforms by by slip casting, pill pressing, cold isostatic pressing, extrusion forming, injection molding, or dry bag pressing. During firing, the debindering or burning out of the binder is conducted under an inert gas, or vacuum, which decomposes the binder so only a small amount of free carbon is left after the burnout. This also helps the sintering to achieve a higher density. The debindering can be performed outside the sintering furnace as well as inside the sintering furnace. Preferably, the debindering is performed outside the sintering furnace up to about 600° C.

In the firing or sintering process, the preformed shapes (greens) are placed in a container such as a crucible or workbox. While the container can be made of a variety of materials which can withstand high temperatures, a preferred material is graphite. In general, it is preferable that the environment surrounding the greens in the container contains silicon carbide and boron carbide phases at a temperature between about 1000° to 2000° C.; the phases inhibit boride or boron carbide from leeching from the preform greens. Thus, an important element in the process of the present invention is providing a means which can maintain an atmosphere consisting of silicon carbide and/or boron carbide phases. Thus, the present invention further provides in the process a container wherein the interior surfaces of the container form a chamber which are coated with an aqueous slurry comprising silicon carbide powder and boron carbide powder to form a first layer which is then coated with silicon carbide particles to form a second layer. The silicon carbide particles are preferably finely divided to form particles with the consistency of a sand or powder. The coated surfaces which comprise the protective coating are allowed to dry before the greens are placed into the chamber of the container for sintering or firing. Preferably, the slurry is about 0.1 to 98 wt % of silicon carbide powder and boron carbide powder. In a most preferred embodiment, the silicon carbide is about 98 wt % and the boron carbide is about 1 wt % and optionally, an organic binder which is about 2 wt % of the slurry. Alternatively, the interior of the container is coated with sintered silicon carbide using boron or boron carbide between about 0.1 to 10 wt % as the sintering aid, or sintering parts covered with a silicon carbide and boron carbide mixture, wherein the silicon and boron carbides in the mixture are between about 0.1 to 30 wt %. It is preferable that the second layer comprise silicon carbide particles of a mesh between about 70 and 120 mesh. Thus, the protective coating provides a means for providing an equilibrium atmosphere that contains boride or boron carbide which inhibits the boride or boron carbide from leeching from the preform greens.

The above coating during the firing or sintering process form a strong heat resistant layer or protective coating over the graphite which is highly resistant to cracking. The enhanced resistance to cracking prevents bleed-through of the carbon from the graphite into the green preform shape during the firing process. Carbon bleed-through is undesirable because the carbon that bleeds through impregnates the green preforms within the crucible and lowers the density of the alumina-based ceramic which in turn can adversely affect one or more of the following properties of the alumina-based ceramic: strength, hardness, toughness, and thermal conductivity, and resistance to corrosion, oxidation, and wear. The protective coating has a useful life of at least 10 firings before the repeated exposure to the extremely high temperatures during the firing or sintering process begins to introduce cracks into the protective coating which can allow carbon from the graphite to bleed into the container. The cracks can be repaired by applying a mixture of the silicon carbide and boron carbide to the crack. During firing, the protective coating also provides an equilibrium atmosphere containing boride or boron carbide which inhibits boride or boron carbide from leeching from the preform greens. Therefore, for fabricating alumina-based ceramics of high density and with the enhanced properties of the ceramics produced according to the process of the present invention, it is preferred that the process be performed in a container which has the above protective coating.

In the process of the present invention, the firing or sintering is performed in a furnace such as a graphite-element furnace which has been fitted to provide a flow of inert gas throughout the furnace during the firing process. In a preferred embodiment, the gas is selected from the group consisting of nitrogen, argon, helium, and mixtures thereof. Preferably, the gas is argon. Alternatively, the firing can be performed in a vacuum. The firing is preferably performed wherein the green preforms, which optionally have been debindered, are placed in a container such as a crucible which has a closure.

While the container has a closure, the container is not sealed but the cover does sit in a close spacial relationship to the container to effectively close the container. Therefore, at high temperatures a carbon atmosphere produced from the furnace, including the heating elements, carbon refractory, and graphite from the outer surfaces of the container, which are not coated with the protective coating, can bleed carbon into the container through the gap between the container and the closure. The carbon in the carbon atmosphere can then impregnate the ceramic composite which can change the composition of the ceramic from its intended composition. Thus, a tight fit between the container and the closure can achieve a reduction in the amount of carbon that can enter the container. Therefore, the fit between the container and the closure is important for reducing carbon bleed-through. However, it was further discovered that by maintaining an equilibrium atmosphere inside the container, the carbon atmosphere produced outside the container during firing does not bleed into the container. Furthermore, it was also discovered that the combination of protective coating and the equilibrium atmosphere inhibited loss of boride or boron carbide from the preform green during the firing process. Boride is volatile and at high temperatures is leeched from the green preform. The leeching of boride changes the boride composition of the ceramic from that which was intended. However, in the process of the present invention, during the firing process, boride is released from the protective coating and maintained in the equilibrium atmosphere at a concentration which maintains a balance between free boride and boride in the preform green. Therefore, the equilibrium atmosphere enables the boride composition to be preserved in the preform green during the firing process. Thus, the equilibrium atmosphere enables fabrication of alumina-based ceramics with densities that approach their theoretical density.

In the process of the present invention, the firing procedure can use any of the following sintering schedules or variations thereof. According to a first sintering schedule, the temperature is ramped from room temperature to 500±100° C. at a rate of about 1° to 5° C. per minute. The temperature is dependent on the size of the green sample and the binder. At 500±100° C. the temperature is increased to 1250° C. at a rate between 1 to 5° C. per minute and then to a temperature between 1600° to 1900° C. at a rate between about 1° to 20° C. per minute. The temperature is held at the highest temperature for a time sufficient to achieve a density greater than 97%, preferably a time between about 10 to 60 minutes with the flow of argon gas at atmospheric pressure. The temperature is then returned to room temperature. Thus, the combination of temperature, gas, container-closure fit, and container coating provides an equilibrium atmosphere which prevents introduction of carbon into the ceramic and inhibits loss of boride from the ceramic. The combination enables production of high density alumina-based ceramics which have a density that is 97% or more of the theoretical density possible for the particular composite.

According to a second sintering schedule, the preformed specimen is placed in the crucible in the furnace with a flow of inert gas. The temperature is raised from room temperature to 450 ±100° C. over a time period of greater than two hours, depending on the size and binder type. Then the temperature is raised to 1300 ±200° C. within a time frame between about 1 to 4 hours. Next, the temperature is raised to 1825 ±50° C. within a time frame of 1 to 4 hours. The temperature is held at 1825 ±50° C. for 10 to 120 minutes before cooling down to room temperature.

According to a third sintering schedule, the increase in temperature from 500° C. to 1600° C. is performed at a rate of 15° to 20° C. per minute. This fast burn or fast firing rate reduces the ability of the aluminum to sinter the carbide which typically occurs if the temperature passes through 1400° C. at a lower rate. The temperature is held between 1600° and 1900° C. for 10 to 120 minutes before cooling down to room temperature. From 1600° to 1900° C. the product densities. While the preferred sintering schedule is similar to the above first sintering schedule, the fast burn rate was found to enhance the production of high density alumina-based ceramics.

The present invention also provides particular composites or compositions which can be used to produce unique alumina-based ceramic products which have a density that is preferably about 97% or greater of the theoretical density for the ceramic produced therefrom. The present invention further provides that the preform green comprising the particular composite or composition can be fired according to the process of the present invention. The particular composites or compositions which are preferred and which preferably are used as the preformed green in the process of the present invention have the following formulation.

Formula 1 consists of 2 wt % of silicon carbide with a median particle size in the size range of 2 to 10 $d_{50}$ μm, 12.6 wt % of silicon carbide with a median particle size in the size range of 0.5 to 1.0 $d_{50}$ μm, 5.4 wt % of boron carbide with a median particle size in the size range of 3 to 11 $d_{50}$ μm, and 80 wt % of alumina with a median particle size in the size range of 0.4 to 1.5 $d_{50}$ μm. Formula 1, which produces a ceramic composite with a Rockwell Hardness A of about 92–93 HRA and an Indentation Toughness (KIC) of 5.9 MPa-m$^{1/2}$, has applications for producing abrasive blast nozzles (e.g., sand blast nozzles), cutting tools, and wear resistant parts.

Formula 2 consists of 14.6 wt % of silicon carbide with a median particle size in the size range of 0.5 to 1.0 $d_{50}$ μm, 5.4 wt % of boron carbide with a median particle size in the size range of 3 to 11 $d_{50}$ μm, and 80 wt % of alumina with a median particle size in the size range of 0.4 to 1.5 $d_{50}$ μm. Formula 2 has applications for producing abrasive blast nozzles (e.g., sand blast nozzles), cutting tools, and wear resistant parts.

Formula 3 consists of 21.4 wt % of silicon carbide with a median particle size in the size range of 0.5 to 1.0 $d_{50}$ μm, 0.5 wt % of boron carbide with a median particle size in the size range of less than 12 $d_{50}$ μm, and 78.1 wt % of alumina with a median particle size in the size range of 0.4 to 1.5 $d_{50}$ μm. Formula 3 has applications for producing wear resistant parts, pump seals, and high temperature structural applications.

Formula 4 consists of 21.4 wt % of silicon carbide with a median particle size in the size range of 20 to 40 $d_{50}$ μm, 0.5 wt % of boron carbide with a median particle size in the size range of less than 12 $d_{50}$ μm, and 78.1 wt % of alumina with a median particle size in the size range of 0.4 to 1.5 $d_{50}$ μm. Formula 4 has applications for high temperature uses such as crucibles and coatings for crucibles useful for making ceramics according to the process of the present invention, tubes, etc.

Formula 5 consists of 5 to 15 wt % of silicon carbide with a median particle size in the size range of 0.5 to 20 $d_{50}$ μm, 1 to 20 wt % of boron carbide or titanium boride with a median particle size in the size range of 1 to 30 $d_{50}$ μm, and 60 to 85 wt % of alumina with a median particle size in the size range of 0.4 to 1.5 $d_{50}$ μm. Formula 5 has potential for a wide range of applications.

The above composites produce alumina-based ceramics which have a density that is about 97% or greater of the theoretical density for the composite and which have one or more desirable properties such as increased strength, toughness, hardness, thermal conductivity which improves resistance to thermal crack formation, and enhanced resistance to corrosion, oxidation, and wear. Therefore, the present invention comprises high-density alumina-based ceramics comprising any one of the above compositions. The present invention further comprises high-density alumina-based ceramics consisting of any one of the above composite formulas when produced according to the process of the present invention.

The present invention further comprises an industrial blast nozzle assembly. FIG. 1 shows a particular embodiment of an industrial blast nozzle assembly 10 which comprises a ceramic liner 20, a casing 30, preferably made from a metal such as brass or aluminum, and optionally, a protective coating 40, preferably polyurethane, which insulates liner 20 from external shock and holds ceramic liner 20 and casing 30 together.

Figure 2:
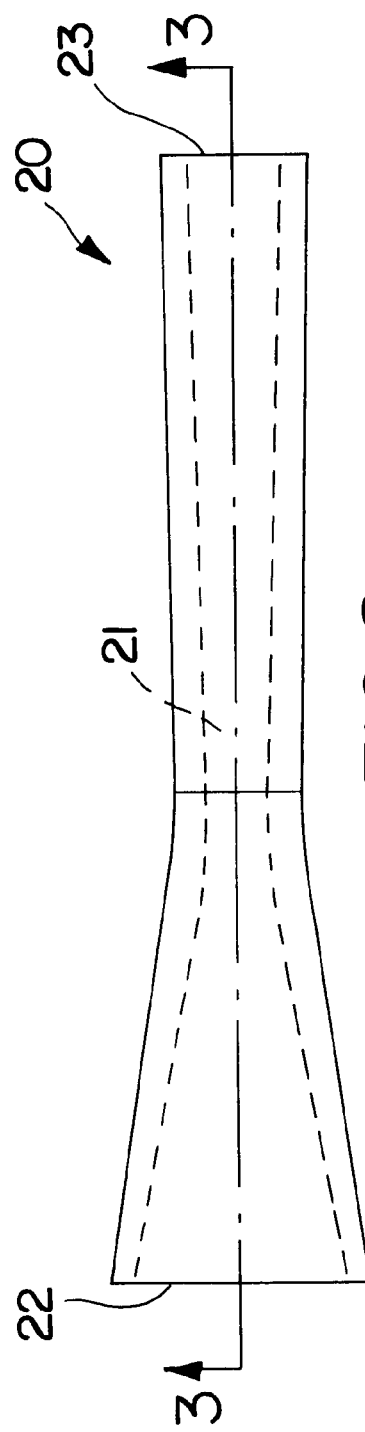
FIG. 2 is plan view of a ceramic liner 20 for an industrial blast nozzle assembly 10.
Figure 3:
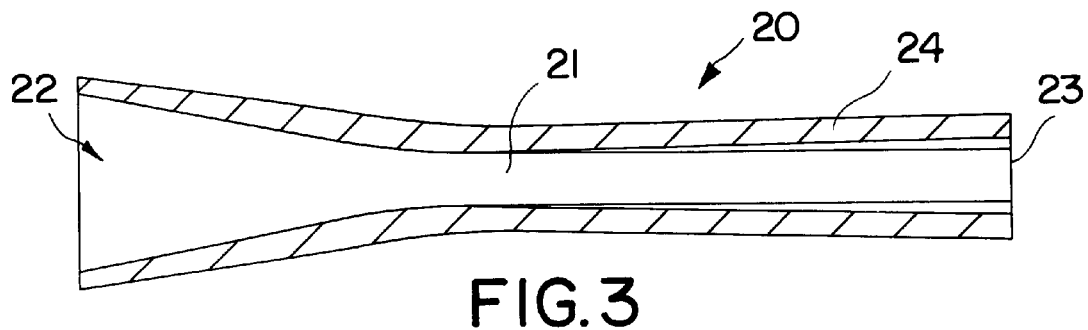
FIG. 3 is a cross-sectional view along the longitudinal axis of the ceramic liner 20 for an industrial blast nozzle assembly 10.

The ceramic liner 20 shown in FIG. 2 is cylindrical with a bore 21 extending therethrough to provide an inlet opening 22 and an outlet opening 23. The bore forms a central venturi nozzle wherein inlet end 22 of bore 21 has a wider diameter than outlet end 23. FIG. 3 is a cross-sectional view along longitudinal axis of ceramic liner 20 showing ceramic composite 24, bore 21, inlet 22, and outlet 23 wherein bore 21 forms a venturi shape. The ceramic composite which comprises liner 20 is 65 to 85 wt % of the alumina, 0.5 to 20 wt % of the boride, and 2 to 21.4 wt % of the metal carbide and has a density of at least 97% of the theoretical density for the ceramic composite. Preferably, the alumina has a median particle size in the size range of 0.4 to 1.5 $d_{50}$ μm, the boride has a median particle size of not more than 30 $d_{50}$ μm, and the metal carbide has median particle size in the size range of 2 to 10 $d_{50}$ μm. In particular embodiments of ceramic liner 20, the ceramic composite comprises the formulae disclosed herein.

Figure 4:
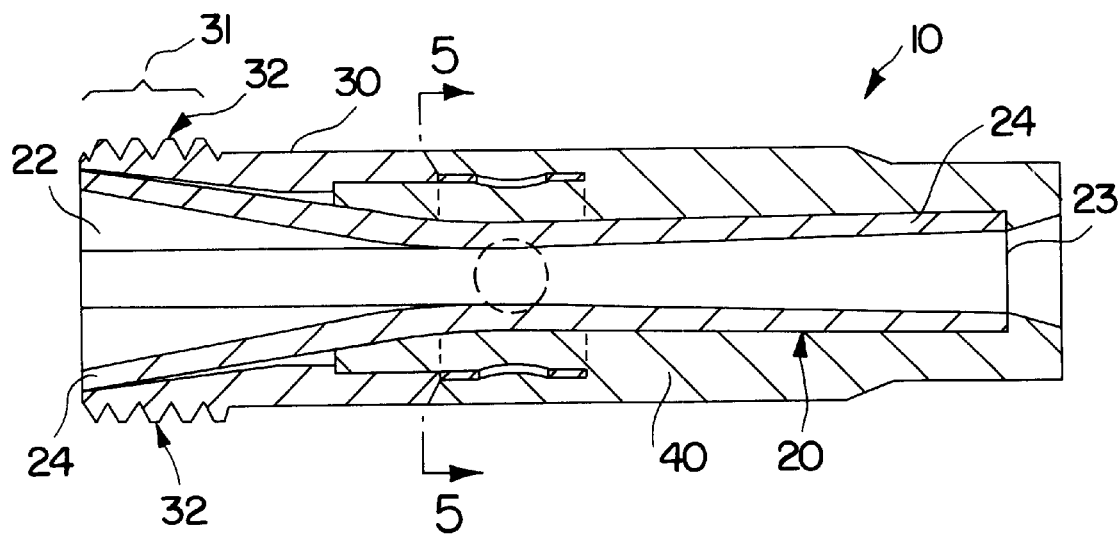
FIG. 4 is a cross-sectional view along the longitudinal axis of an industrial blast nozzle assembly.
Figure 5:
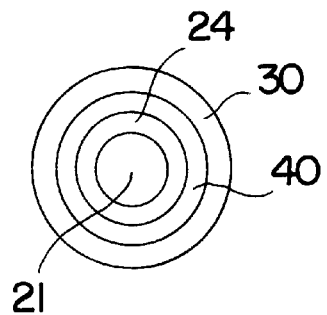
FIG. 5 is a cross-sectional along line 5—5 of FIG. 4.

FIG. 4 shows a cross-sectional view along the longitudinal axis of nozzle assembly 10 wherein inlet end 22 of liner 20 is inserted through and mounted in the casing 30 which in this particular embodiment has a threaded end 31 with threads 32 such that the liner ceramic composite 24 at inlet end 22 of liner 20 and threaded end 31 of casing 30 form an end which is substantially flush. FIG. 4, also shows that in this particular embodiment, the liner 20 and casing 30 are held together with protective coating 40. FIG. 5 is a cross-sectional along line 5—5 of nozzle assembly 10 in FIG. 4 showing bore 21 through liner 20, metal casing 30, and protective coating 40. While FIGS. 1 through 4 show an industrial blast nozzle assembly having a casing with a threaded end and a protective coating, in particular embodiments of the industrial blast nozzle assembly, the casing does not have a threaded end or a protective coating or both.

Figure 6:
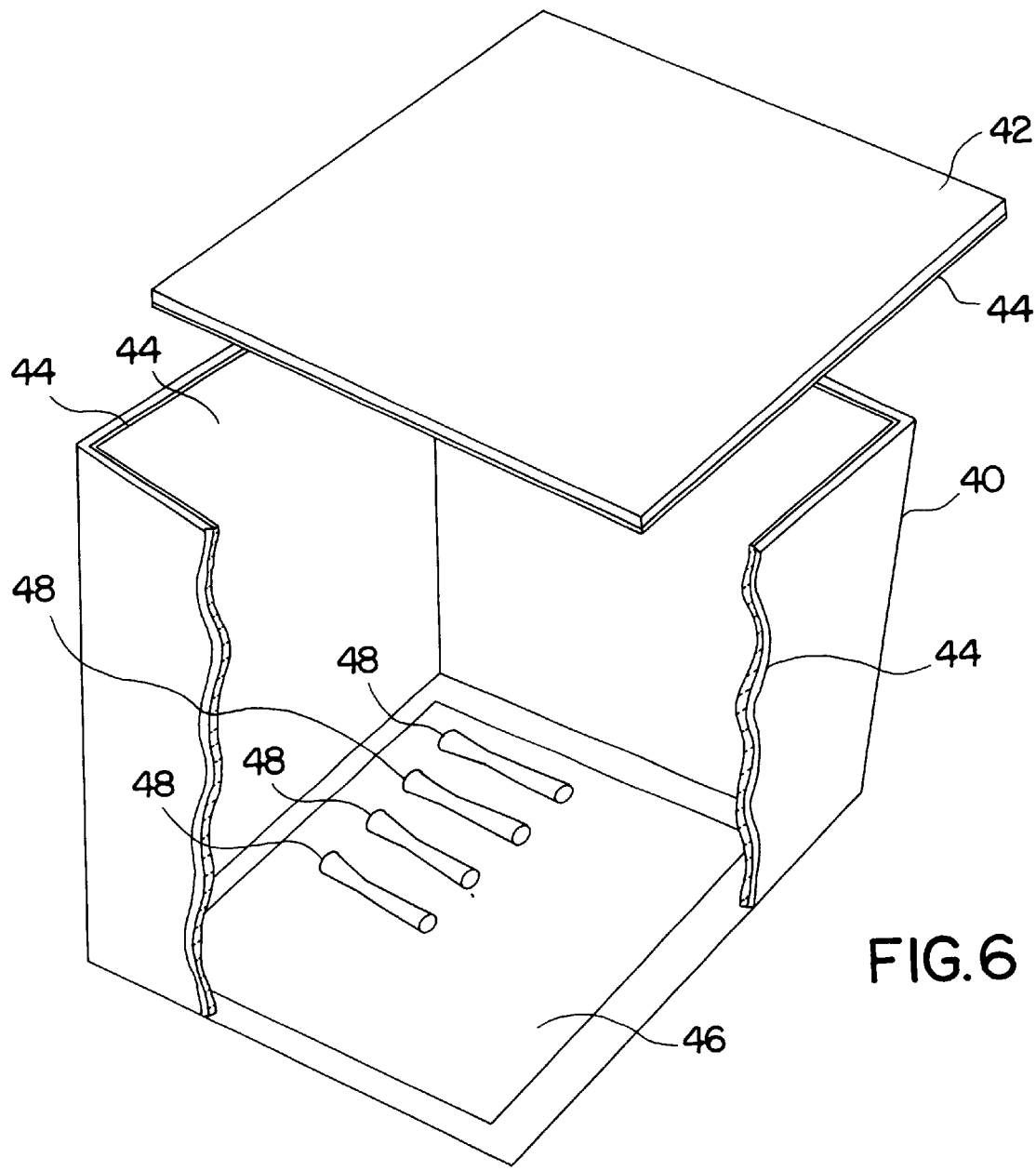
FIG. 6 is a an exploded and cut-a-way view of a container 40 and closure 42 for fabricating ceramic composites with a protective layer 44 on the inner surfaces of the container 40. Inside the container 40 is a boron carbide plate 46 with green preforms 48 of the ceramic liners 20 for nozzle assembly 10 placed thereon.

The ceramic liner 20 for nozzle assembly 10 is fabricated according to the process of the present invention which uses a container with the protective coating which enables maintenance of the equilibrium atmosphere. FIG. 6 shows an exploded and cut-a-way view of container 40 and closure 42, which is used for sintering preform greens 48 of ceramic liners 20, with protective layer 44 on the inner surfaces of container 40. Inside container 40 is a boron carbide plate 46 with green preforms 48 of ceramic liners 20 for an industrial blast nozzle assembly placed thereon.

The following examples are intended to promote a further understanding of the present invention.

EXAMPLE 1

This example provides an example of the method of the present invention for preparing high density alumina-based ceramics. In particular, a ceramic from a composite consisting of 78.2 wt % of Aluminum oxide ($Al_2O_3$), 21.3 wt % of silicon carbide, and 0.5 wt % of boron carbide ($B_4C$).

A graphite crucible with a tight lid was used. The interior surface of this crucible and lid were coated with a liquid coating layer which was immediately covered with a layer of 70 to 120 mesh silicon carbide sand which acts as a sealer. The coating layer was applied as a slurry comprising 98 wt % silicon carbide powder, 1 wt % boron carbide and 2 wt % of an organic binder in water of an amount to provide a slurry of sufficient fluidity to evenly coat the interior surfaces of the crucible and lid. After covering the coating layer with the silicon carbide sand, the slurry was allowed to dry. The specially coated crucible was then used for sintering the composite prepared below.

The composite was formed as follows. A mixture was made which contained 156 gram of aluminum oxide powder with a median particle size in the size range of 0.4 to 1.5 $d_{50}$ μm, 42.48 gram of silicon carbide powder with a median particle size in the size range of 0.5 to 1.0 $d_{50}$ μm, 1.021 gram of boron carbide with a median particle size less than 12 $d_{50}$ μm, and 6 gram of PVP were dispersed in 100 gram of water. The mixture was ball milled for 24 hours to produce a slurry. The solid green samples were prepared by either slip casting of the above slurry, or compacting the spray dried powder from the mixture into the solid green samples (dry pressing). After allowing the solid green samples to dry, the dried green samples were placed inside the above crucible with the special coating and the crucible was covered with the lid. The green composite was calculated to comprise 78.2 wt % of Aluminum oxide, 21.3 wt % of silicon carbide, and 0.5 wt % of boron carbide.

The sintering schedule was as follows. The crucible containing the solid green samples was placed in a graphite-element furnace and heated at a ramp from 2° to 5° C. per minute up to 500° C., then from 5° to 10° C. per minute up to 1250° C., and finally from 2° to 20° C. per minute to 1600° to 1900° C. The temperature was held within the final range for 10 to 60 minutes under a flow of argon gas at atmospheric pressure. Inside the crucible an atmosphere was created which was the specific boride containing environment for sintering the composite.

Afterwards, the density of the fired samples was measured by Archimedes' method as a percentage of the theoretical density (T.D.). The results are shown in Table 1.

TABLE 1

| Sample # | Forming Method | Sintering Temp. (° C.) | Holding Time (min.) | Density (% T.D.) |
| --- | --- | --- | --- | --- |
| 1 | Slip Casting | 1825 ± 25 | 20 | 99.1 |
| 2 | Slip Casting | 1825 ± 25 | 25 | 98.6 |
| 3 | Dry Pressing, 1 ton/cm² | 1825 ± 25 | 20 | 98.5 |

This example demonstrates that the process of the present invention produces high density ceramics with a composite density above 98% of the theoretical density. This is extremely important because each 1% increment of density above 97% can dramatically increase the properties of the composite. Because the protective coating on the interior surfaces of the crucible prevented carbon bleed-through, this example demonstrates that the protective coating on the interior surfaces of the carbon/graphite crucible provides a practical and low cost means for production of alumina-based ceramics of very high density. The equilibrium atmosphere, which was used in the process for sintering composites, is an important condition of the process which prevents carbon from entering the crucible and impregnating the ceramic and simultaneously providing boride from the protective coating which inhibits the leeching of boride from the ceramic. Thus, the process of the present invention enables production of multiphase ceramic composites of high density.

EXAMPLE 2

This example demonstrates the process of the present invention using a composite that consisted of 80 wt % alumina, 14.6 wt % silicon carbide, and 5.4 wt % boron carbide.

Samples were prepared according to the process in Example 1 except that composite comprised 80 wt % alumina with a median particle size in the size range of 0.4 to 1.5 $d_{50}$ μm, 14.6 wt % silicon carbide with a median particle size in the size range of 0.5 to 1.0 $d_{50}$ μm, and 5.4 wt % boron carbide with a median particle size in the size range of 3 to 11 $d_{50}$ μm. The composite was ball milled for 24 hours as in Example 1 and the green samples were prepared as in Example 1. The sintering schedule was as in Example 1. The density of the fired samples was measured by Archimedes' method as a percentage of the theoretical density (T.D.) as shown in Table 2.

TABLE 2

| Sample # | Forming Method | Sintering Temp. (° C.) | Holding Time (min.) | Density (% T.D.) |
| --- | --- | --- | --- | --- |
| 4 | Slip Casting | 1825 ± 25 | 20 | 99.1 |
| 5 | Slip Casting | 1825 ± 25 | 25 | 98.4 |
| 6 | Dry Pressing, 1 ton/cm² | 1825 ± 25 | 24 | 98.4 |
| 7 | Dry Pressing, 1 ton/cm² | 1825 ± 25 | 24 | 98.6 |
| 8 | Dry Pressing, 1 ton/cm² | 1850 ± 25 | 30 | 98.6 |

This example further demonstrates that using a second composite, the process of the present invention was still able to produce a high density ceramic with a density above 98% of the theoretical density. The example further shows that the second composite, like the composite in example 1 can be used to produce ceramics with desirable properties.

EXAMPLE 3

This example provides the formulae for several ceramic composites of the present invention for producing alumina-based high density ceramics.

Formula 1 consists of 2 wt % of silicon carbide with a median particle size in the size range of 2 to 10 $d_{50}$ μm, 12.6 wt % of silicon carbide with a median particle size in the size range of 0.5 to 1.0 $d_{50}$ μm, 5.4 wt % of boron carbide with a median particle size in the size range of 3 to 11 $d_{50}$ μm, and 80 wt % of alumina with a median particle size in the size range of 0.4 to 1.5 $d_{50}$ μm. Formula 1 was used to produce a high density ceramic using a sintering schedule similar to that in Example 1.

Formula 2 consists of 14.6 wt % of silicon carbide with a median particle size in the size range of 0.5 to 1.0 d50 μm, 5.4 wt % of boron carbide with a median particle size in the size range of 3 to 11 $d_{50}$ μm, and 80 wt % of alumina a median particle size in the size range of 0.4 to 1.5 $d_{50}$ μm. Formula 2 was used to produce a high density ceramic using a sintering schedule similar to that in Example 1.

Formula 3 consists of 21.4 wt % of silicon carbide with a median particle size in the size range of 0.5 to 1.0 $d_{50}$ μm, 0.5 wt % of boron carbide with a median particle size less than 12 $d_{50}$ μm, and 78.1 wt % of alumina with a median particle size in the size range of 0.4 to 1.5 $d_{50}$ μm. Formula 3 was used to produce a high density ceramic using a sintering schedule similar to that in Example 1.

Formula 4 consists of 21.4 wt % of silicon carbide with a median particle size in the size range of 20 to 40 $d_{50}$ μm, 0.5 wt % of boron carbide with a median particle size less than 12 $d_{50}$ μm, and 78.1 wt % of alumina with a median particle size in the size range of 0.4 to 1.5 $d_{50}$ μm. Formula 4 was used to produce a high density ceramic using a sintering schedule similar to that in Example 1.

Formula 5 consists of 5 to 15 wt % of silicon carbide with a median particle size in the size range of 0.5 to 20 $d_{50}$ μm, 1 to 20 wt % of boron carbide or titanium boride with a median particle size in the size range of 1 to 30 $d_{50}$ μm, and 60 to 85 wt % of alumina with a median particle size in the size range of 0.4 to 1.5 $d_{50}$ μm. Formula 5 was used to produce a high density ceramic using a sintering schedule similar to that in Example 1.

EXAMPLE 4

Table 3 shows a comparison of erosion tests for composites made from Formula 1 to published erosion tests for other composites. Fabrication of the ceramic product comprising Formula 1 used the process which was shown in Example 1.

TABLE 3

Comparison of Erosion Test for (ASTM G76-83)

| Sample | Erosion Rate (cm³/g) at 90° | Density (g/cm³) |
|---|---|---|
| Formula 1 | $1.37 \times 10^4$ | 3.645 |
| Formula 1 | $1.09 \times 10^4$ | 3.638 |
| Formula 1 | $1.43 \times 10^4$ | 3.662 |
| Silicon nitride[1] | $2.8 \times 10^4$ | 3.23 |
| Cemented Co$_2$ tungsten carbide[1] | $1.4 \times 10^4$ | 14.846 |
| ROCTEC 500[1] | $0.1 \times 10^4$ | 15.55 |

[1]From published literature. ROCTEC 500 a trademark for a tungsten carbide ceramic composite produced by Kennametal, Inc., Latrobe, PA.

Table 3 shows that Formula 1 produces a ceramic with an average erosion rate of less than silicon nitride-based ceramic composites and less than or equal to the 6% Co cemented ceramic carbides. The advantage of the present invention is that Formula 1 has less than ¼ the weight of tungsten carbide. While the erosion rate for Formula 1 was greater than the ROCTEC 500, it has the advantage of reduced cost and weight compared to the ROCTEC.

EXAMPLE 5

This example compares the service life of ceramics made from composite Formula 1 to other ceramics made from other composites in the manufacture of nozzles.

The process was as in Example 1 except that the production firing procedure used the following sintering schedule. The temperature was ramped from room temperature to 600° C. at a rate of 2° to 3° C. per minute in a vacuum. Then 600° to 1150° C. at a rate of 5° to 6° C. per minute. Then from 1150° to 1825° C. ±25° C. at a rate of 10° to 20° C. per minute followed by holding at 1825° C. ±25° C. for 20 to 40 minutes. The service life was 50 to 100 hours under production using aluminum oxide grit as the abrasive.

The ceramic composite products produced herein have been defined in terms of the composition of the starting material comprising the green preform. Therefore, the ceramic composites are to be viewed as the kind of ceramic composite that is produced from the particular compositions disclosed herein. Defining the ceramic composite in terms of the starting material is used as a matter of convenience because it is well known in the manufacture of ceramic composites that the components comprising the starting material are volatile and will vaporize to different extents and/or form alloys with other components of the starting material, and/or undergo other transformations during the firing process. Thus, after firing, the components in the ceramic composite will not necessarily be in the same proportion as they existed in the starting material. Therefore, while the ceramic composites are discussed in terms of their starting material, it is not to be construed that the final ceramic product will have the same composition as the starting material.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

I claim:

1. An industrial blast nozzle assembly with a metal casing having a liner comprising a ceramic composite having a bore extending therethrough to provide an inlet opening and an outlet opening wherein the ceramic composite comprises 65 to 85 wt % of an alumina, 0.5 to 20 wt % of a ceramic boron compound selected from the group consisting of boron carbide, titanium boride and zirconium boride, and 2 to 21.4 wt % of a metal carbide and has a density of at least 97% of a theoretical density for the ceramic, wherein the liner is fired to produce the ceramic composite in a graphite container lined with a composition comprising a silicon carbide, without pressing.

2. The industrial blast nozzle assembly of claim 1 wherein the inlet opening has a wider diameter than the outlet opening and there is a venturi shape in the bore between the inlet and the outlet openings.

3. The industrial blast nozzle assembly of claim 1 wherein the alumina has a median particle size in the size range of 0.4 to 1.5 $d_{50}$ μm, the boride has a median particle size of not more than 30 $d_{50}$ μm, and the metal carbide has a median particle size in the size range of 2 to 10 $d_{50}$ μm.

4. The industrial blast nozzle assembly of claim 1 wherein the metal carbide is selected from the group consisting of silicon carbide, titanium carbide, zirconium carbide, and mixtures thereof.

5. The industrial blast nozzle assembly of claims 1, 2, 3, or 4 wherein the boron compound consists of boron carbide.

* * * * *